(12) United States Patent
Sarabandi et al.

(10) Patent No.: US 10,050,696 B2
(45) Date of Patent: Aug. 14, 2018

(54) FULL BAND RF BOOSTER

(71) Applicant: THE REGENTS OF THE UNIVERSITY OF MICHIGAN, Ann Arbor, MI (US)

(72) Inventors: Kamal Sarabandi, Ann Arbor, MI (US); Mani Kashanianfard, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 83 days.

(21) Appl. No.: 15/365,000

(22) Filed: Nov. 30, 2016

(65) Prior Publication Data

US 2017/0155196 A1    Jun. 1, 2017

Related U.S. Application Data

(60) Provisional application No. 62/261,535, filed on Dec. 1, 2015.

(51) Int. Cl.
*H04M 1/00* (2006.01)
*H04B 7/155* (2006.01)

(52) U.S. Cl.
CPC .............. *H04B 7/155* (2013.01); *Y02D 70/12* (2018.01); *Y02D 70/122* (2018.01)

(58) Field of Classification Search
CPC ....... H04B 7/155; Y02D 70/12; Y02D 70/122
USPC ........ 455/11.1, 7, 13.1, 575.7, 562.1, 556.1; 370/315, 328; 343/572.1, 572.7, 702, 343/730, 848, 802, 835, 841, 893
See application file for complete search history.

(56) References Cited

U.S. PATENT DOCUMENTS

| | | | | |
|---|---|---|---|---|
| 5,045,862 A | * | 9/1991 | Alden | H01Q 1/248 343/700 MS |
| 6,703,935 B1 | * | 3/2004 | Chung | G06K 7/10316 340/572.1 |
| 7,119,745 B2 | * | 10/2006 | Gaucher | H01Q 9/26 343/700 MS |
| 7,761,093 B2 | | 7/2010 | Sabat, Jr. et al. | |
| 8,686,920 B2 | * | 4/2014 | Sarabandi | H01Q 1/525 343/893 |

(Continued)

FOREIGN PATENT DOCUMENTS

WO    WO-2010033990 A1    3/2010

*Primary Examiner* — Tan H Trinh
(74) *Attorney, Agent, or Firm* — Harness, Dickey & Pierce, P.L.C.

(57) ABSTRACT

A directional repeater system is presented with a simple architecture composed of wideband receive and transmit antennas, a high gain low-power amplifier and a bandpass filter suitable for use in the 2450 MHz ISM band. Close to 70 dB of isolation between transmit and receive antennas over the entire band is achieved for a compact structure. The isolation between the transmit and receive antennas is achieved using polarization mismatch between orthogonal double-stack patch antennas and a two-element receive antenna whose elements are appropriately located with respect to the edge of the substrate ground plane and the transmit antenna to cancel the signal leakage from the transmit antenna to the individual receive antennas. A major advantage of this invention is that the entire bandwidth can be used going through a chain of repeaters whereas for conventional repeaters the available bandwidth is halved for every repeater in the chain.

15 Claims, 8 Drawing Sheets

(56) References Cited

U.S. PATENT DOCUMENTS

| | | | | |
|---|---|---|---|---|
| 2004/0110469 A1* | 6/2004 | Judd | .................... | G01S 19/25 455/15 |
| 2004/0233111 A1* | 11/2004 | Desclos | .................... | H01Q 1/38 343/700 MS |
| 2007/0222607 A1* | 9/2007 | Ho | .................... | H01Q 1/2225 340/572.7 |
| 2009/0067371 A1* | 3/2009 | Pesce | .................... | H01Q 1/2291 370/328 |
| 2009/0079653 A1* | 3/2009 | Semonov | .................... | H01Q 1/38 343/793 |
| 2010/0156641 A1* | 6/2010 | Lionetti | .................... | B60C 23/0408 340/572.1 |
| 2010/0182206 A1* | 7/2010 | Barbieri | .................... | H01Q 1/2291 343/702 |
| 2011/0063181 A1* | 3/2011 | Walker | .................... | H01Q 9/16 343/803 |
| 2011/0181476 A1* | 7/2011 | Raappana | .................... | H01Q 9/0442 343/702 |
| 2012/0218156 A1* | 8/2012 | Mohammadian | .................... | H01Q 1/241 343/730 |
| 2012/0313821 A1* | 12/2012 | Fischer | .................... | H01Q 9/0407 343/700 MS |
| 2014/0218258 A1* | 8/2014 | Walker | .................... | H01Q 1/007 343/848 |
| 2015/0249928 A1 | 9/2015 | Alicot et al. | | |
| 2016/0043473 A1* | 2/2016 | Walker | .................... | H01Q 1/38 343/835 |
| 2016/0111778 A1* | 4/2016 | Zhou | .................... | H01Q 1/243 343/841 |
| 2016/0285175 A1* | 9/2016 | Juan | .................... | H01Q 21/26 |
| 2017/0110784 A1* | 4/2017 | Vermes | .................... | H01Q 1/2291 |
| 2017/0179578 A1* | 6/2017 | Semonov | .................... | H01Q 1/246 |

* cited by examiner

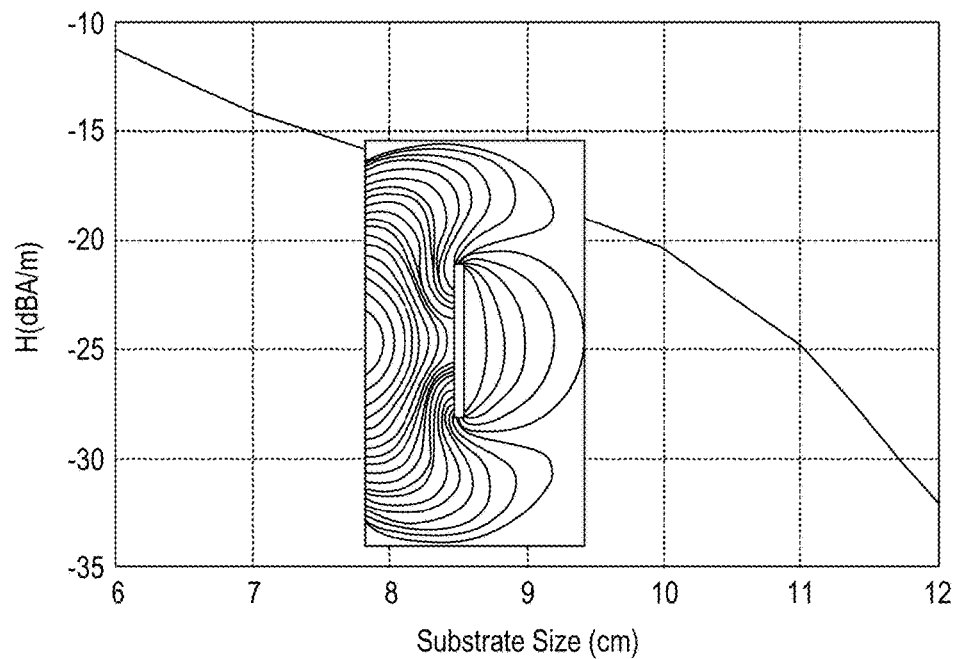
FIG. 1
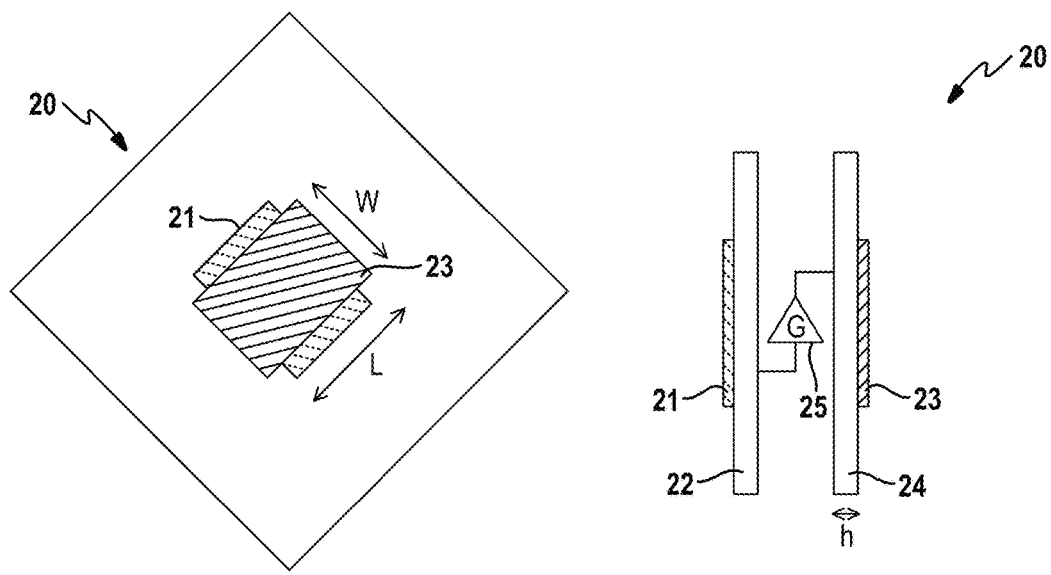
FIG. 2A
FIG. 2B

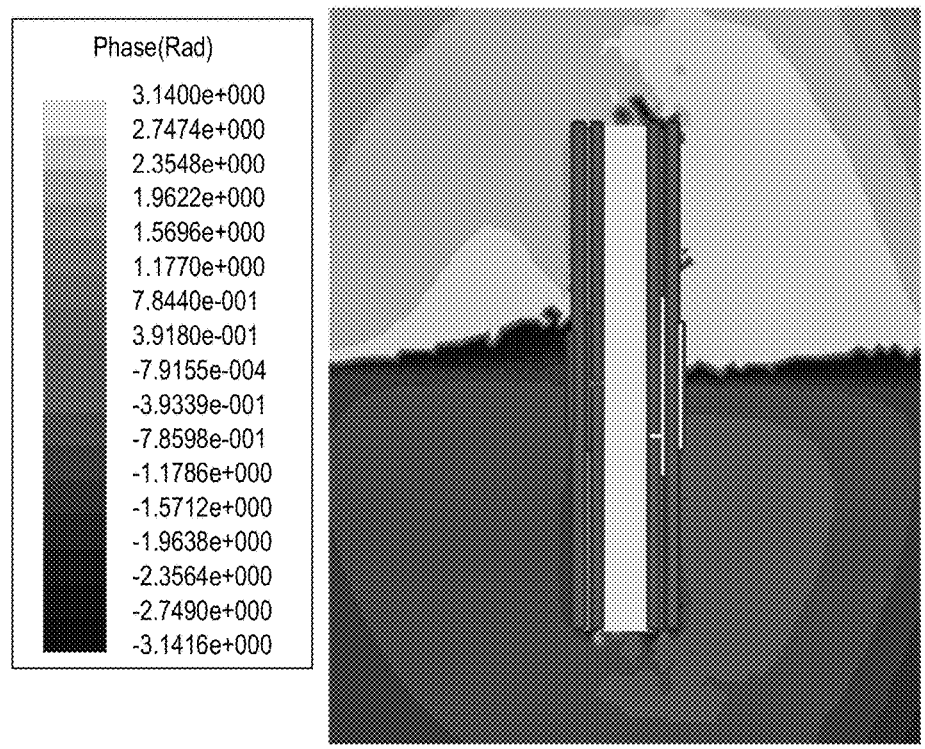
FIG. 5
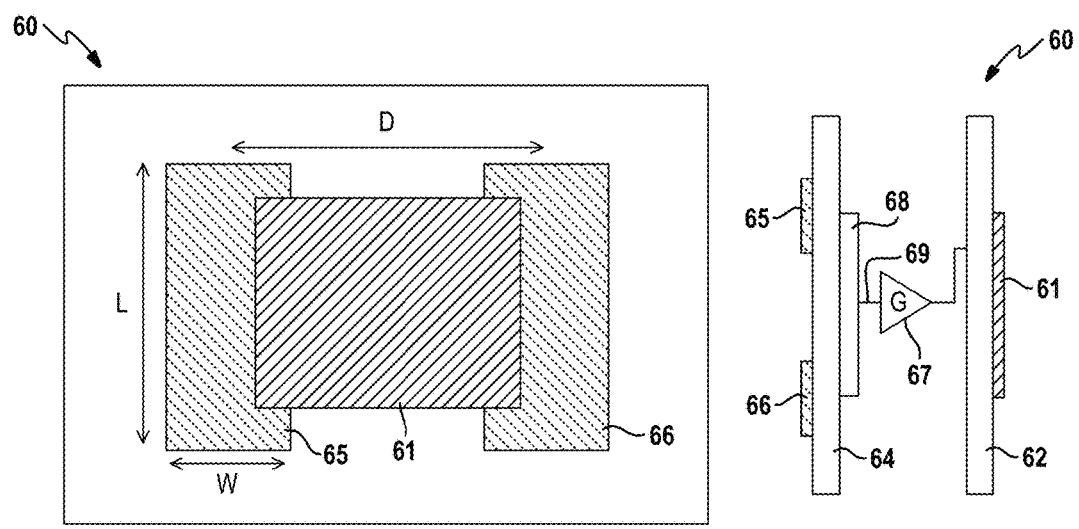
FIG. 6A  FIG. 6B

FULL BAND RF BOOSTER

CROSS-REFERENCE TO RELATED APPLICATIONS

This application claims the benefit of U.S. Provisional Application No. 62/261,535, filed on Dec. 1, 2015. The entire disclosure of the above application is incorporated herein by reference.

GOVERNMENT CONTRACT

This invention was made with government support under grant number W911NF-08-2-0004 awarded by the U.S. Army/ARO. The Government has certain rights in the invention.

FIELD

The present disclosure relates to a directional repeater system with improved transmit and receive antenna isolation.

BACKGROUND

Radio repeaters are commonly used to enhance the radio connectivity in harsh communication environments where the effects of the communication channel such as multipath, attenuation and non-line of sign have an adverse impact on the connectivity of the channel. A radio repeater can assist reestablishing the line-of-sight between the transmitter and receiver in such environments. In addition, a radio repeater can be used to extend the communication range by amplifying and retransmitting the signal along a desired direction. Most radio repeaters down-convert the signal and then up-convert and retransmit at a different frequency. The advantage of using this theme is that the transmit (Tx) and receive (Rx) channels are isolated through the system diplexer. However, a significant portion of the power used by these systems is devoted to changing the carrier frequency and only a small fraction of the power used by the system is the radiated power. In addition, such repeaters must rely on a communication protocol to be able to receive and transmit in separate channels which increases the complexity of the repeater significantly as well as decreasing the repeater's compatibility with different devices and the number channels that can be simultaneously supported. Alternatively, a protocol independent low power repeater that consists only of Tx and Rx antennas and a low power high gain amplifier can be used. Using this theme, all communications from multiple users and different modulation schemes in the frequency band of the repeater can be supported simultaneously. This way no protocols for routing the data packets of different users need to be satisfied and the full bandwidth can be utilized with high power efficiency. The main challenge in implementing this configuration pertains to the coupling level between the adjacent Tx and Rx antennas operating at the same frequency band. The mutual coupling between the two antennas creates a feedback which if higher than the reciprocal of the amplifier gain, can cause the system to go to oscillation. This coupling imposes a restriction on how high the amplifier gain can be chosen. Several approaches have been proposed to decrease the mutual coupling between the antennas. These approaches include modifying the currents on the ground plane on which the antennas are fabricated, using engineered electromagnetic structures such as electromagnetic band baps (EBG), or creating destructive interference between the two antennas. The defected ground structures improve the isolation but degrade radiation polarization and pattern. EBG structures usually require periodic geometry and large dimensions. Destructive interference between the antennas requires an odd multiple of half wavelength distance between the two Tx antennas as well as accurate, non-symmetric power distribution between the two Tx antennas.

Recently a protocol independent omnidirectional radio repeater for ad-hoc communications at IMS based was introduced. While omnidirectional repeaters provide good coverage in all directions and can handle forward and backward links simultaneously, they are not beneficial if the path loss in the channel is not significant as will be shown later in this disclosure. Moreover, as will be shown, the signal level must decrease by 10 dB every time the signal passes through a repeater if a 20 dB signal to noise ratio throughout the communication path is desired. In this disclosure, a directional repeater system is presented with much improved Tx and Rx antenna isolation. The isolation improvement is achieved by separating the antennas by a ground plane in between and also creating a polarization mismatch between the two antennas. This technique exploits the fact that most mobile platforms that use the IMS band to communicate are designed to be able to transmit and receive in both vertical and horizontal polarizations.

This section provides background information related to the present disclosure which is not necessarily prior art.

SUMMARY

This section provides a general summary of the disclosure, and is not a comprehensive disclosure of its full scope or all of its features.

A radio repeater is presented with improved transmit and receive antenna isolation. The radio repeater includes a transmit antenna, a receive antenna subassembly and an amplifier circuit electrically coupled between the transmit antenna and the receive antenna subassembly. The transmit antenna has an elongated shape with a longitudinal axis and is disposed on a first planar substrate. The receive antenna subassembly is disposed on a second planar substrate, where the first planar substrate is arranged substantially parallel with the second planar substrate. The receive antenna subassembly is comprised of two elongated antennas spaced apart from each other such that longitudinal axis of the two elongated antennas are parallel to each other but perpendicular to longitudinal axis of the transmit antenna. The spacing between the two receive antennas and the spacing of the two receive antennas to closest edge of the ground plane are preferably configured so that each achieve a 180 degree phase difference in coupling signals of the transmit patch antenna.

The transmit antenna and the two receive antennas may be in the shape of a rectangle.

The transmit antenna and the two receive antenna may be further defined as patch antennas or slot antennas.

The radio repeater further includes a first feed pin that electrically couples to the receive antenna and is positioned to maximize impedance matching, and a second feed pin that electrically couples to the transmit antenna and is positioned to maximize impedance matching.

In one embodiment, the transmit antenna and the receive antenna subassembly are sized to operate in frequency range of 2.4 GHz to 2.5 GHz.

In some embodiments, a rectangular metallic box may be interposed between the transmit antenna and the receive antenna subassembly, such that the first planar substrate and the second planar substrate are disposed on opposing surfaces of the rectangular metallic box and the amplifier circuit is contained in the rectangular metallic box.

In some embodiments, a first parasitic patch antenna is disposed on a first ground plane, where the first ground plane is disposed on the receive antenna subassembly; and a second parasitic patch antenna is disposed on a second ground plane, where the second ground plane is disposed on the transmit antenna.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a graph showing a magnetic field pattern of a double stacked pin-fed patch antenna with a finite ground plane and the magnetic field at the center point at the back of the ground plane plotted as a function of the ground plane size;

FIGS. 2A and 2B depict an example embodiment of a radio repeater with an orthogonal arrangement of the transmit and receive double stacked patch antennas to reduce the front-to-back coupling by creating a polarization mismatch between the antennas;

FIG. 5 shows the phase of the normal to the plane of the plot (co-pol) component of the electric field when the transmitter patch (right) is excited;

FIGS. 6A and 6B depict another example embodiment of the radio repeater with a two element receive antenna subassembly;

Corresponding reference numerals indicate corresponding parts throughout the several views of the drawings.

DETAILED DESCRIPTION

Figure 3:
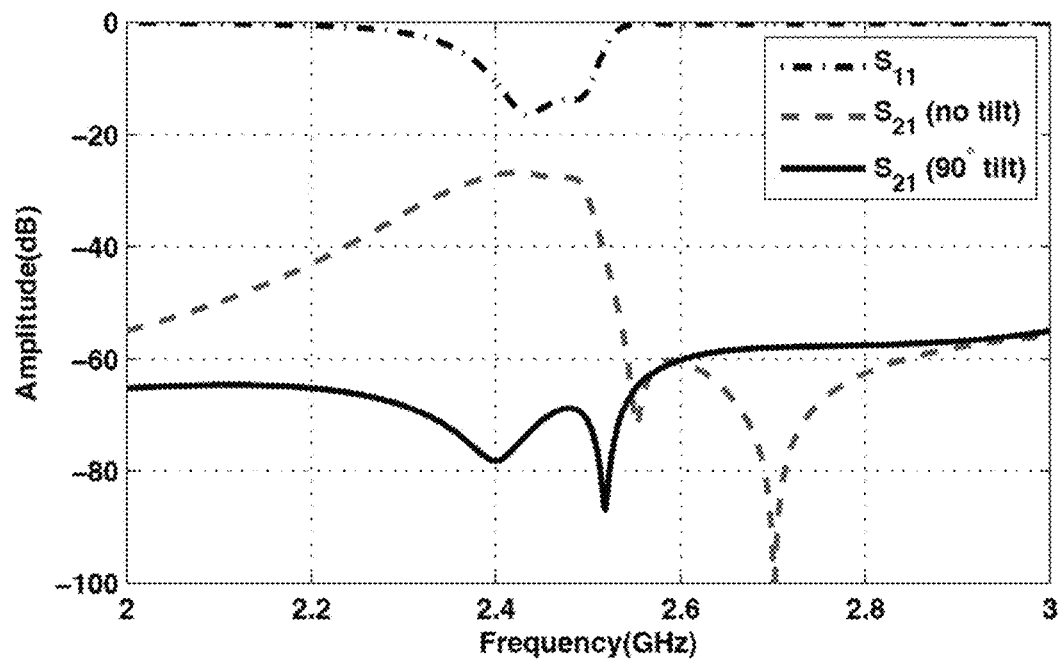
FIG. 3 is a graph illustrating the isolation between the two patch antennas with parallel and orthogonal arrangements.

Example embodiments will now be described more fully with reference to the accompanying drawings. The main challenge in designing a high gain radio repeater, simply composed of Tx and Rx antennas and an amplifier is establishing a good isolation between the transmitter and receiver antennas. In order to achieve high levels of isolation between the two antennas a number of steps are proposed.

Back-to-back patch element antennas separated by a common ground plane is chosen. This allows for the design of a directional repeater with inherent isolation provided by the ground plane. In fact, infinite isolation can be achieved if the ground plane is infinite in extent. In practice, it is desired to minimize the size of the repeater and as such the ground planes are finite and designed to be as small as possible. Depending on the size of the ground plane, there exists a magnetic field circling around the ground plane which is the main source of coupling between patch elements placed on the opposite side. The magnetic field distribution around a patch antenna with a finite ground plane is shown in FIG. 1. As seen in the graph, the magnetic field does not vanish in the shadowed area between the patch antenna and a second antenna placed in the shadowed region will have a finite coupling with the original antenna.

FIGS. 2A and 2B depict an example embodiment of a radio repeater 20 constructed in accordance with these design principles. The radio repeater 20 is comprised of a receive antenna 21, a transmit antenna 23 and an amplifier circuit 25. The receive antenna 21 and the transmit antenna 23 have an elongated shape defining a longitudinal axis. For example, the receive antenna 21 and the transmit antenna 23 are in the shape of a rectangle although other elongated shapes are contemplated by this disclosure. In the example embodiment, the receive antenna 21 and the transmit antenna 23 are further defined as patch antennas. While reference is made throughout this disclosure to patch antennas, other type of planar antennas, such as slot antennas, also fall within the scope of this disclosure.

In one embodiment, the receive antenna 21 and the transmit antenna 23 may be disposed on opposing sides of a common ground plane (not shown). In the example embodiment, the receive antenna 21 is disposed on a first ground plane 22 and the transmit antenna 22 is disposed on a second ground plane 24 as seen in FIG. 2B, where the first ground plane is arranged substantially parallel with the second ground plane. The amplifier circuit 25 is electrically coupled between the receive antenna 21 and the transmit antenna 23. More importantly, the longitudinal axis of the receive antenna is perpendicular to the longitudinal axis of the transmit antenna as seen in FIG. 2A.

In the example embodiment, the patch antennas are designed to cover the operating band of 2.4 GHz to 2.5 GHz. In operation, the transmit antenna transmits a signal at same frequency at which the signal was received by the receive antenna. The patch antennas are fabricated on a 8 cm by 8 cm substrate with dielectric constant of $\epsilon_r=2.2$ and thickness of h=3.15 mm. In this example, the design parameters are W1=30 mm, W2=31 mm, L1=39.1 mm, L2=38.9 mm and the pin feed has a distance of Y0=9 mm from the edge of the patch. The separation between the two substrates is 6 mm. While the exemplary embodiment of radio repeater has been described above with specific components having specific values and arranged in a specific configuration, it will be appreciated that these systems may be constructed with many different configurations, components, and/or values as necessary or desired for a particular application. The above configurations, components and values are presented only to describe one particular embodiment that has proven effective and should be viewed as illustrating, rather than limiting.

FIG. 3 shows the isolation between the two antennas of the radio repeater 20 with and without the polarization mismatch. As seen in the graph, a 40 dB or better improvement in the isolation over the operating band (2.4 GHz to 2.5 GHz) is achieved by introducing a polarization mismatch between the two antennas.

Sufficient care must be taken while using this configuration in a practical scenario since the signal polarization undergoes a 90° change when going through each repeater along the communication path. Most commonly used platforms (cellphones, mobile robots, surveillance cameras, etc.) that would communicate through the repeater network do not operate in pure horizontal or vertical polarization and therefore are able to communicate with the repeater in either polarization. For this reason, the change in polarization does not impact the network connectivity. However, in cases where the repeaters are placed in proximity of the ground at a lower altitude than two times the wavelength, communication in horizontal polarization is immensely compromised due to interference with ground reflections. In such cases, the repeater must be tilted 45° with respect to the ground in plane of the patch so that both receiver and transmitter antennas operate in both vertical and horizontal polarizations. In the worst case scenario, since the repeater is close to the ground, the horizontal polarization does not reach the next repeater in line and the received signal is purely vertical. Hence the path loss is 3 dB more than the case where pure vertical polarization is transmitted. In addition, the receiver antenna makes a 45° angle with respect to the vertical direction which creates an additional 3 dB loss due to polarization mismatch. As a result, the overall improvement is 6 dB less than the case where the repeater is placed well above the ground.

Figure 4:
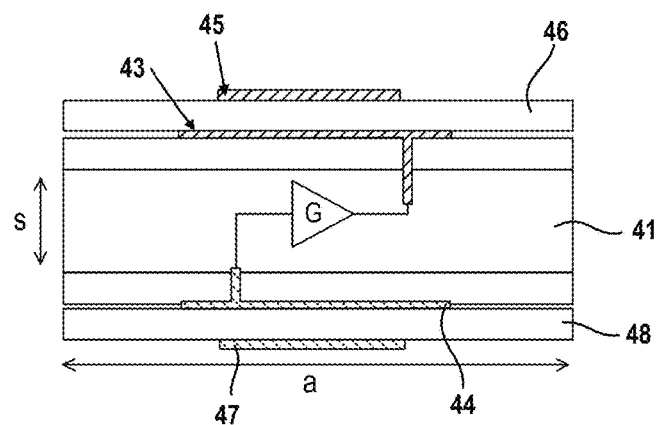
FIG. 4 is a side view of a radio repeater showing the transmit and receive double stacked patch antennas with a metallic box inserted between the two substrates.

Placing circuit components in between the transmitter and receiver antennas disturbs the near field of the antennas and can result in less isolation than predicted above. To circumvent these unknown effects, the entire circuitry is placed inside a metallic box 41 in between the two antennas as shown in FIG. 4. Adding the metallic box 41 does not have a significant effect on the coupling between the two antennas. However, the couple is a weak function of the dimensions of the box (i.e., a×a×S), where the separation between the two antennas (S). These values can be tuned to achieve an isolation very close to what was achieved in the absence of the box. In the example embodiment, the optimized values are S=8 mm and a=8 cm.

FIG. 4 also illustrates that parasitic antenna elements can be added to the radio repeater. In this example, the transmit and receive antennas 43, 44 are sandwiched between two ground planes. Parasitic patch elements are then disposed on the outwardly facing surfaces of the ground planes. That is, a first parasitic patch element 45 is place on top ground plane 46 near the transmit antenna 43 and a second patch element 47 is placed on the bottom ground plane 48 near the receive antenna 44. Parasitic antenna elements may take other forms as understood by those skilled in the art.

The main source of coupling between the two perpendicular patches is the cross-polarized component of the near field of the antennas. FIG. 5 shows the phase of the normal component of the electric field when the horizontally polarized patch is excited. As seen in the graph, the phase of this component undergoes a rapid 180° change when crossing the plane of symmetry of the structure. This fact can be used to further reduce the coupling between the two antennas. By using a two-element patch array as the receiver antenna as opposed to a single patch, the array elements can be placed such that they receive out of phase coupling from the transmitter antenna. As a result the coupling between the array antenna and the transmitter antenna can be farther reduced. The spacing between the two array elements must be optimized to achieve a 180° phase difference in the received coupling signal by the two antennas.

FIGS. 6A and 6B depict another example embodiment of the radio repeater 60, where the receiver antenna is replaced with a two-element array. The radio repeater 60 includes a transmit antenna 61, a receive antenna assembly 63 and an amplifier circuit 67. The transmit antenna 61 is disposed on a first planar substrate 62 (i.e., ground plane); whereas, the receive antenna assembly 63 is disposed on a second planar substrate 64. In this embodiment, the receive antenna assembly is comprised of two rectangular patch antennas 65, 66 spaced apart from each other such that longitudinal axis of the two rectangular patch antennas are parallel to each other but perpendicular to longitudinal axis of the transmit patch antenna as seen in FIG. 6A. Terminals of the two receive antennas are connected by a 100 Ohm microstrip 68 and the center of the 100 Ohm microstrip is connected to a 50 Ohm microstrip line 69 constituting the terminal of the receive antenna assembly.

Additional isolation between the Tx and Rx antennas is achieved using the two-element Rx antenna whose elements are appropriately located with respect to the Tx antenna. To improve the isolation and increase the bandwidth, two identical double-stack pin-fed patch antennas oriented 90° with respect to each other are designed on two separate substrates that are placed back-to-back in proximity of each other. This 90° tilt angle is intended to create a polarization mismatch between the receiver and to create a polarization mismatch between the receiver and transmitter antennas which in turn should drastically improve the isolation between the antennas.

Figure 7:
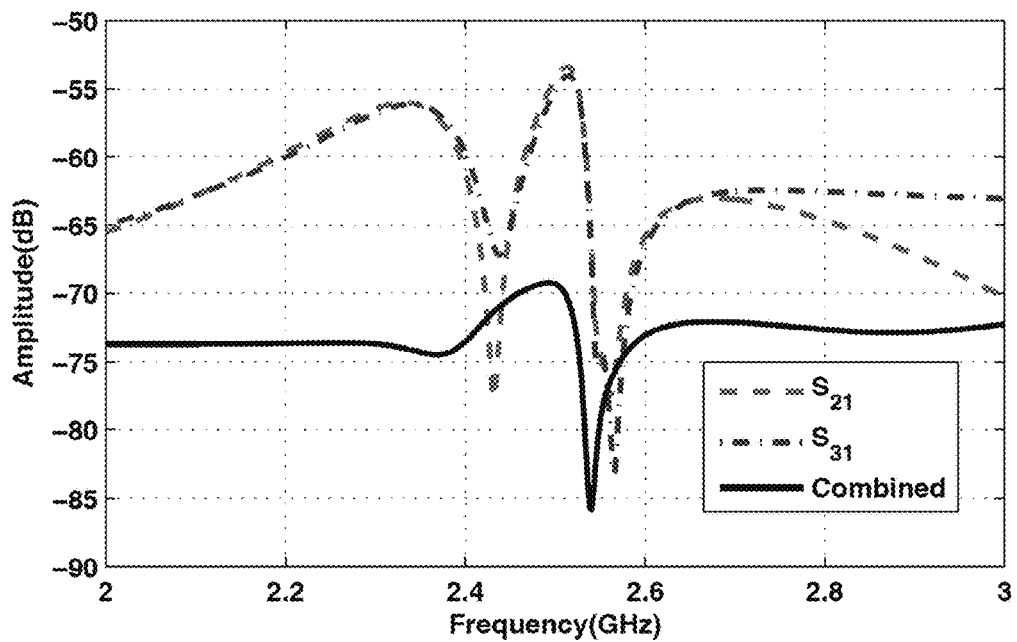
FIG. 7 is a graph showing coupling between the transmitter patch and each antenna on the receiver array (dashed lines) and coupling between the transmitter patch and the combined array (solid line)
Figure 8:
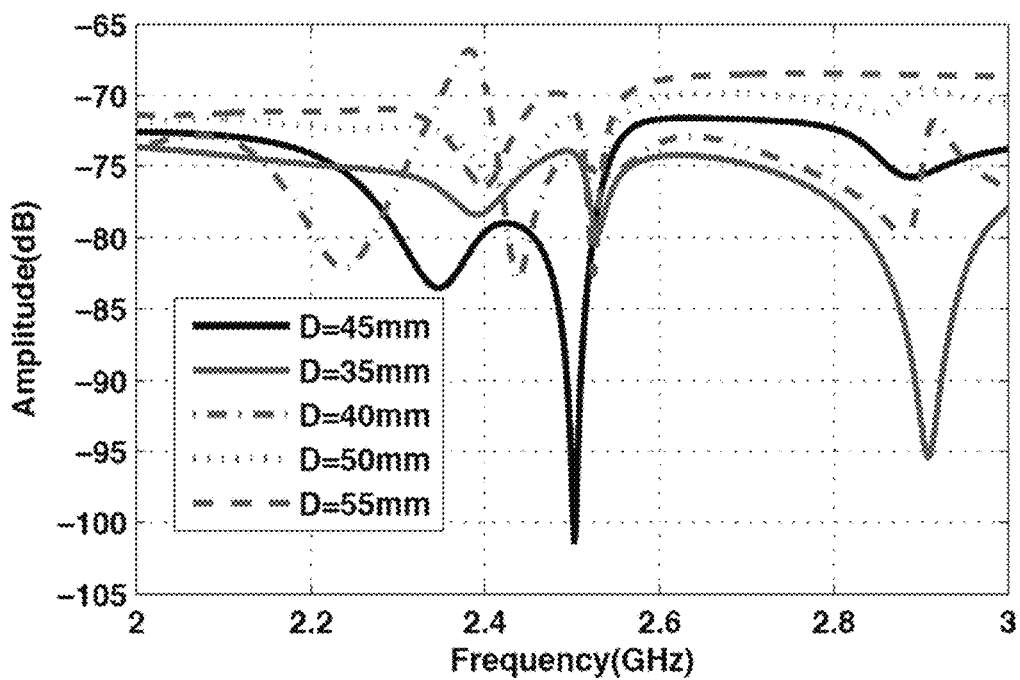
FIG. 8 is a graph showing coupling between the transmitter antenna and the receiver array for different values of receiver array separation (D)
Figure 9:
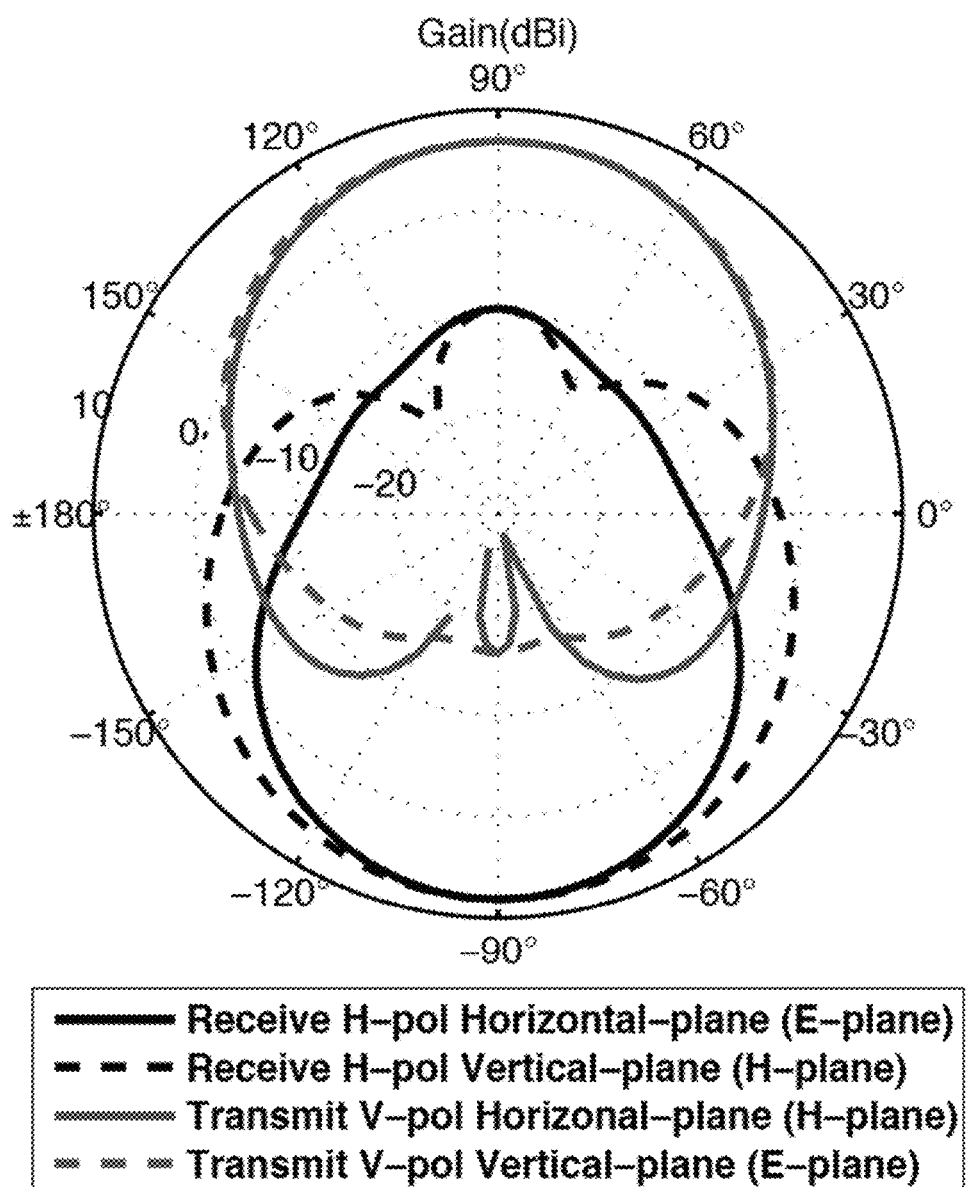
FIG. 9 is a diagram illustrating the transmit and receive radiation patterns in both vertical and horizontal planes.

As shown in FIG. 7, the coupling between the transmitter antenna 61 and each element of the receiver array 65, 66 is more than the case where a single element antenna is used as the receiver. This is due to the fact that array elements are not centered with respect to the plane of symmetry of the transmitter patch 61. However, the coupling reduces significantly when the two elements are combined in-phase to form a two-element array. The spacing between the array elements was optimized to achieve the highest isolation within the operating frequency band of 2400 MHz to 2500 MHz. More specifically, the spacing (D) is between the center of the patches. The coupling between transmit and receive antennas for different values of spacing between the two array elements is plotted in FIG. 8. The distance from the center of a receive patch to the closest edge of ground plane is also important since the transmit signal from the transmitter going to the left and arriving at a receiver and the signal going to the right and arriving at a receiver have different path lengths so as to add up out of phase. The transmitter antenna is kept as before but the array elements are redesigned to have an input impedance of 100Ω and array bandwidth of 100 MHz. In one embodiment, the design parameters for the two element receive assembly is W1=21 mm, W2=20 mm, L1=38.6 mm, L2=38.8 mm, D=45 mm and Y0=9 mm and the separation between the two back-to-back substrates is 10 mm. The distance from the center of a receive patch to the closest edge is 37.5 mm.

As proof of concept, the receiver and transmitter antennas are fabricated on separate substrates and are placed back to back. The receiver antenna consists of two pin-fed patch antennas that are connected to the ends of two identical 100Ω microstrip lines which are in turn connected to a T-junction power divider that matches the total input impedance of the array to 50Ω. The received signal from the array is initially amplified on the receiver board using a two stage amplifier with a total gain of 32 dB. The amplified signal is then transferred to the transmitter board using a pair of MCX RF connectors that are attached directly to the boards and clip on to each other as the two boards are placed back-to-back. The signal undergoes an additional stage of amplification and filtering on the transmitter board before it reaches the transmitter antenna. The amplifier chain on the transmitter board consists of a 16 dB amplifier and a voltage controlled variable gain amplifier (−15 dB to 25 dB). The transmit and receive antennas are designed to have the maximum isolation within the desired operation band. However, the isolation drops outside the operation band and can cause the system to oscillate if proper filtering is not used. A coupled microstrip line bandpass filter with a three pole response and passband of 2.4 GHz to 2.5 GHz is inserted before the second amplifier chain. The total active gain of the system can be varied between 33 dB and 73 dB using a potentiometer that is accessible via an opening on one of the sides of the metallic box. The system is powered using a 3.7V battery with 1500 mAh capacity and this voltage is down converted to 1.8V using a linear regulator. The entire amplifier chain draws less than 50 mA at 1.8V for output powers below 0 dBm. The current consumption increases to 150 mA when the last stage amplifier goes to saturation with output power of 21 dBm.

Radio repeaters can be used in complex environments to mitigate the adverse effects of the communication channel such as non-line-of-sight and multipath fading. In addition, they can be used in environments closely resembling free space to simply extend the range of communication without requiring high power transmission. The performance of the proposed repeater is analyzed in both scenarios separately.

For simplicity, first assume the case of free space transmission along a linear path. Assume all repeaters have antenna gains of $G_t^{ant}$ and $G_r^{ant}$ and an active gain of $G^{amp}$. The signal that is received by the repeater i along the path is therefore given by:

$$P_f^i = P_f^{i-1} + 20\log\left(\frac{\lambda}{4\pi}\right) + G_t^{ant} + G_r^{ant} + G^{amp} - 20\log(R_i) = P_f^{i-1} + G^i \quad (1)$$

where $G^i$ is the total power gain from repeater i−1 to repeater i and $R_i$ is the distance between the repeater i and i−1. In addition to the forward transmission there is an unwanted backward propagation due to the backlobe of the antennas. This back-propagation is not to be confused with the desired backward communication when a two way link is required. Since the repeaters are directional, supporting a two way link requires two separate sets of repeaters for forward and backward communication. This case will be addressed separately. Assuming front-to-back ratios of $F_t$ and $F_r$ for the transmit and receive antennas of all repeaters, the amount of back propagation signal received by the repeater i is given by $$P_b^i = P_f^{i+1} + G^{i+1} - F_t - F_r \quad (2)$$

The back-propagation signal creates feedback and can cause the repeater pair to go to oscillation. To avoid oscillation, $P_b^i$ must be smaller than $P_f^i$ which ensures a loop gain of less than 0 dB for the feedback loop. Moreover, since the repeaters are usually placed several wavelengths apart from each other, the back-propagating signal and the main signal have no correlation and therefore the back-propagating signal is essentially noise and must be significantly lower than the front propagating signal. For a signal to noise ratio of 20 dB, that is $2G^i - F_t - F_r \leftarrow 20$ dB. Ideally $G^i$ is kept at 0 dB to ensure all the repeaters receive the same power and the signal level does not decay along the path. To satisfy this condition, a front-to-back ratio of better than 10 dB for the antennas is required.

If unidirectional repeaters are used, the front-to-back ratios are negligible. Therefore $G^i$ must be kept below −10 dB. This constraint renders the entire repeater network useless in close to free space conditions since the power received at the repeater i from the repeater i−1 is $P_f^i - 10$ dB but the power received from repeater i−2 is $P_f^i - 6$ dB assuming equal distances between all repeaters. Therefore adding the repeater i−1 does not improve the signal received by the repeater i and so on. A unidirectional repeater can still be useful in complex environments where a direct line of sight between repeaters i−2 and i does not exist or the path loss is significantly more than that of free space due to multipath fading or other undesired effects. However, because of the above constraint on $G_i$, which is still valid in complex environments, the signal-to-noise ratio will be reduced by 10 dB every time the signal is passed through a repeater. This fact severely limits the performance of the repeater network in practical scenarios.

The directional nature of the proposed repeater eliminates the above mentioned difficulties. However, a separate set of repeaters is needed to establish a two-way link between different communication devices in the system. There are many ways to accomplish this task without causing the entire system to go to oscillation. Considering the simple one-dimensional case mentioned above, each backward link repeater can be in between two forward link repeaters and with equal distance from both repeaters. A similar analysis to what was presented above shows that the cross talk between the two links will not cause oscillations in the system if $F_t + F_r > 6$ dB.

To evaluate the performance of the repeater when direct line-of-sight exists between two communication devices, the repeater was placed between two horn antennas and the enhancement in the transmitted signal level between the two horn antennas was measured. The horn antennas were placed inside an anechoic chamber and had a distance of 14 meters. The proposed directional repeater was oriented at a 45° tilt to be able to communicate with both horn antennas in vertical polarization. Based on the discussion above, this method reduces the performance of the repeater by 6 dB because of 3 dB polarization mismatch in both transmitter and receiver patch antennas. The transmission between the two horn antennas is measured in the presence and absence of the repeater. The ratio between the two measurements (Transmission improvement) is plotted in FIG. 10. This value is measured for both the single-patch repeater and the two-element patch array repeater. The results show a 25 dB to 35 dB improvement in transmission between the two horn antennas in the presence of the patch array repeater. The total active gain for the repeater utilizing the patch array is 62 dB and that of the single patch design is 50 dB.

Figure 10:
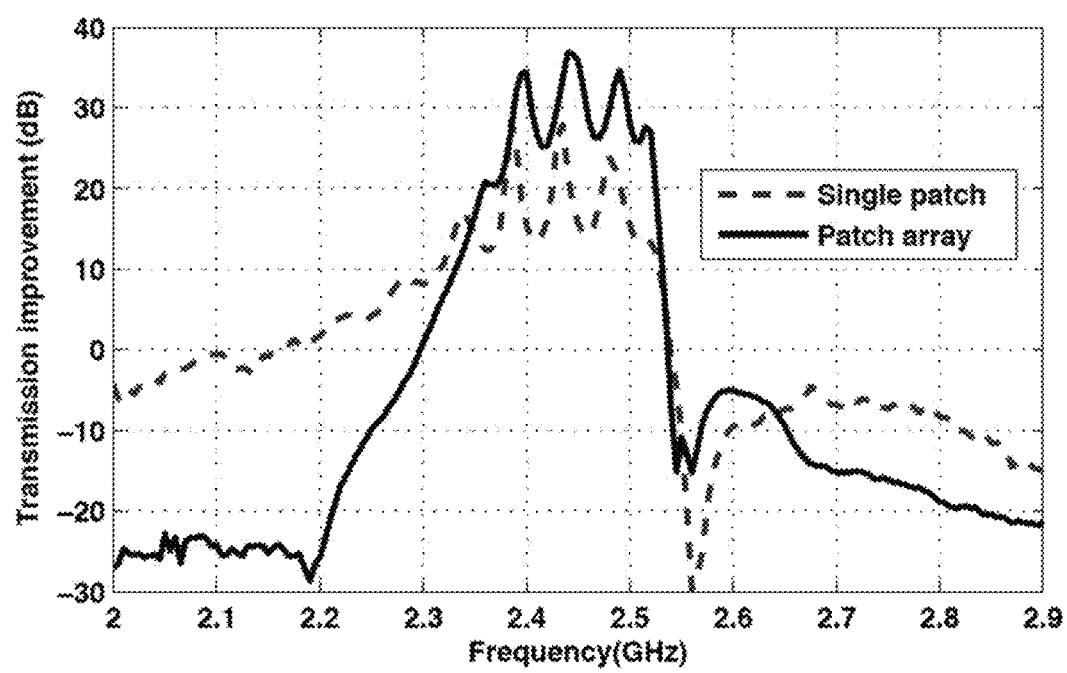
FIG. 10 is a graph showing the improvement in transmission when the line-of-sight is not blocked.

As seen in FIG. 10, there are several ripples in the overall gain of the repeater even though the amplifier and antenna gains are smooth functions of frequency. The reason for this ripple is the leakage between the two antennas. The leakage between the transmitter and receiver patch antennas created a feedback loop and affects the overall gain of the system. Total gain of a feedback loop can be expressed as $G/(1-GF)$ with G and F being the forward gain and feedback respectively. The GF term is a function of frequency and its phase in particular varies rapidly with frequency. Depending on the phase of GF, the total system gain can be lower or higher than the forward gain G. As a result of the phase variation of GF, the overall gain of the system varies rapidly with frequency as shown in the graph.

Once the repeater is assembled, the exact coupling between the transmitter and receiver antennas as a function of frequency cannot be easily measured. Any attempt to connect an outside source to the antennas will change the coupling between the two antennas. However, an estimate of the coupling between the antennas can be obtained using FIG. 10. At the worst case, the difference between the two consecutive peaks and nulls in the overall gain of the system is about 11 dB as seen in the graph. Assuming the magnitude of coupling between the two antennas does not change significantly between a null and the next peak, the difference in overall gain can be attributed to a 180° change in phase of GF and therefore the peak to peak ripple value can be estimated as $$\frac{1+|GF|}{1-|GF|}.$$

Using this estimation the value of |GF| is found to be −5 dB which yields |F|32−67 dB. The isolation between the two antennas were theoretically predicted to be better than −80 dB which is 13 dB lower than our estimate. This difference between measurement and simulation is caused by imperfections in fabrication. FIG. 10 also shows the same measurement results for the proposed single patch repeater 20. In this case a coupling of less than −70 dB between the two antennas in the operation band of 2.4 GHz to 2.5 GHz is predicted theoretically. However the estimated coupling from the measurement results is slightly less than −54 dB which shows a 16 dB difference with the theoretical value. In this case the active gain of the amplifiers used is 50 dB. Note that additional reflections from the measurement setup or surrounding objects are not likely sources of the large coupling observed in measurements. Since the measurement setup for both repeaters was the same, the coupling due to surrounding objects would be very close in magnitude in both cases. However the coupling values observed in both cases are greatly different.

Figure 11:
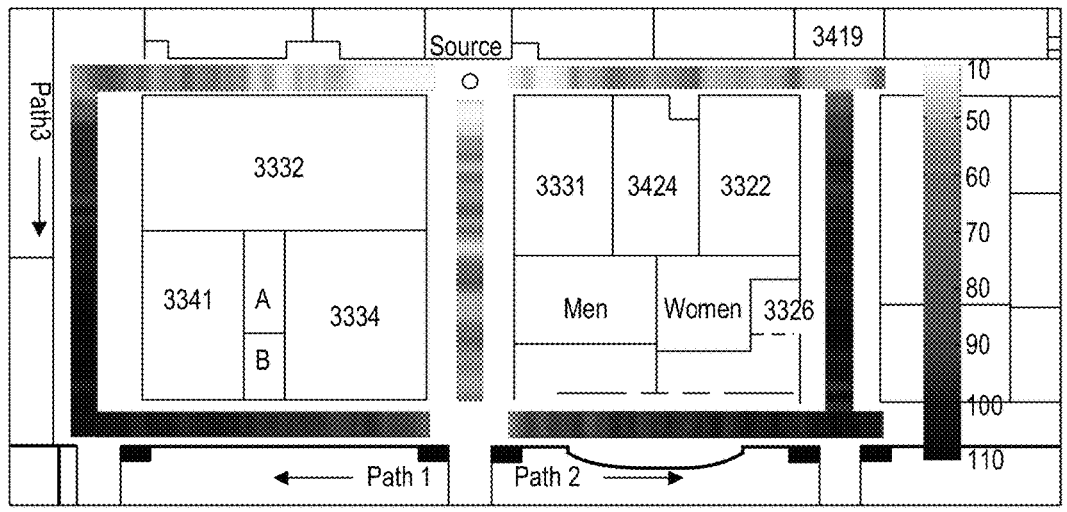
FIG. 11 is a diagram showing the field distribution of a short dipole source in the EECS hallways with the repeater turned off.
Figure 12:
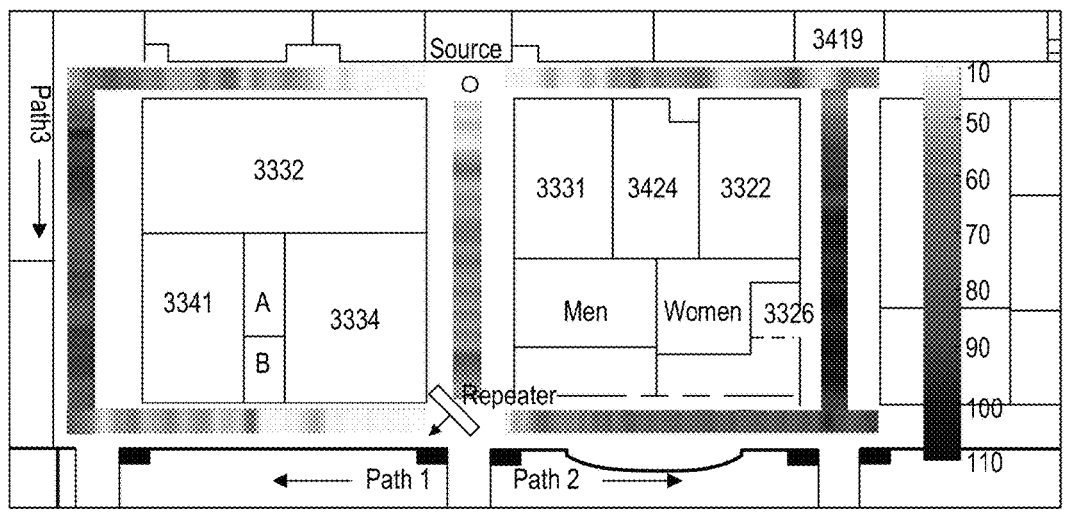
FIG. 12 is a diagram showing improvement in coverage in the hallways in presence of the repeater.
Figure 13:
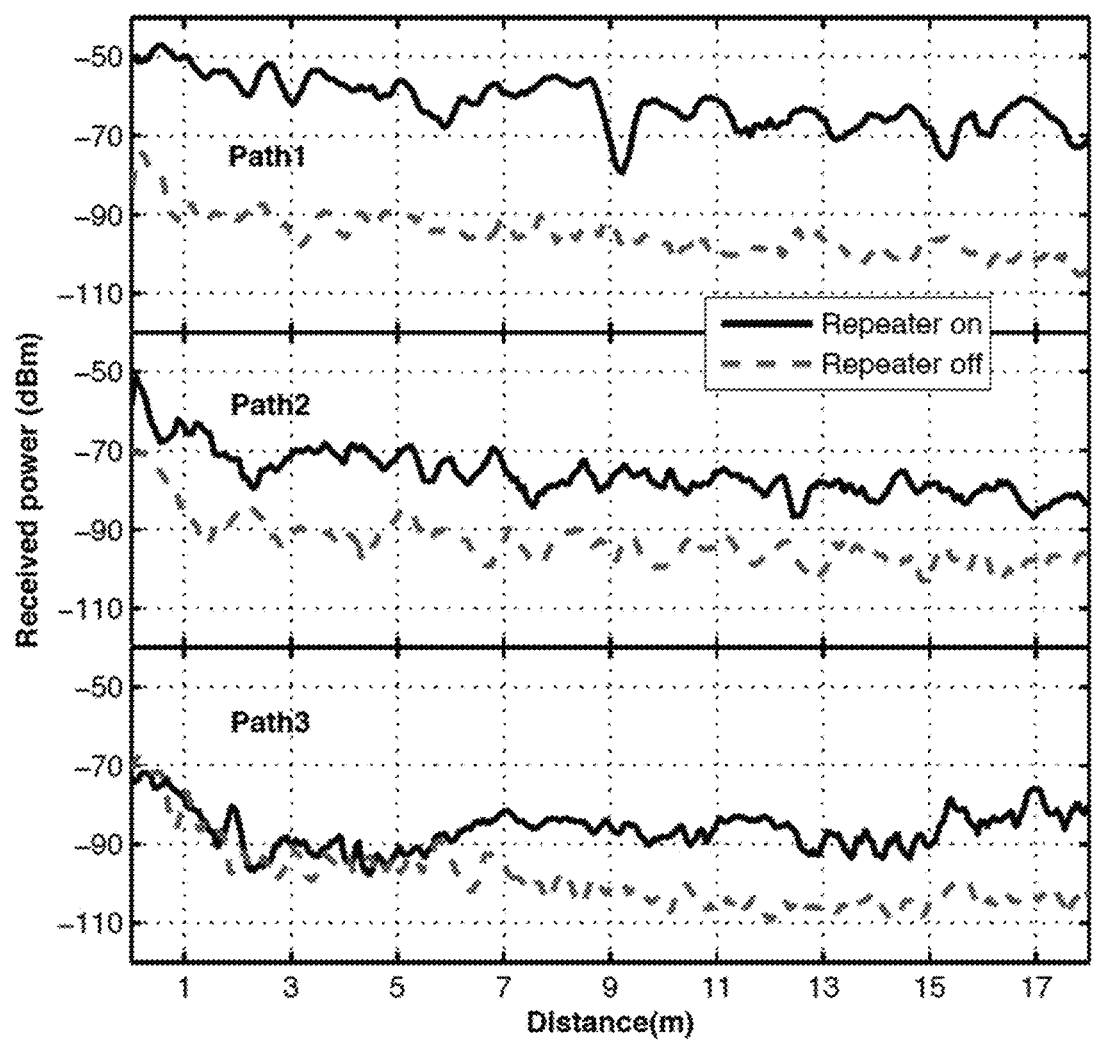
FIG. 13 is a graph illustrating the improvement in transmission between the antennas in presence of both type of repeaters.

In order to evaluate the performance of the repeater when a direct line of sight cannot be established, a short dipole was placed inside the EESC building at the University of Michigan and the field distribution across the hallways was measured in the presence and absence of the repeater. An identical short dipole was used as the receiver. To mimic the polarization impurity of most common platforms, the receiver dipole was deployed at a 45 degree angle with respect to the ground whereas the transmitter antenna was placed vertically. The repeater was placed at an intersection between two perpendicular hallways and made a 45 degree angle with both hallways to be able to send/receive signal through both hallways. A single frequency signal with 0 dBm power at 2.45 GHz used as the transmit signal. The receiver antenna recorded four times every second. The measurement results are shown in FIGS. 11 to 13. As seen in the graph, a significant improvement (20-40 dB) was observed in areas where a direct line of sight does not exist without the repeater (path1 and path2).

In this disclosure a directional repeater system with a simple architecture composed of a transmit antenna, a receive antenna and an amplifier and filter is presented. Because of this simplicity, the repeater is energy efficient and does not require down-conversion and up-conversion with frequency translation and complicated operational protocols to manage users. In fact, different protocols and channels can be simultaneously supported. Close to 70 dB of isolation is achieved between the Tx and Rx antennas that allows significant amplification of the received signal to be retransmitted in desired directions. The isolation improvement between the Tx and Rx antennas. The repeater is fabricated and tested in different environments and significant signal coverage enhancement is demonstrated in all cases.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A radio repeater, comprising:
a transmit antenna having an elongated shape with a longitudinal axis and disposed on a first planar substrate;
a receive antenna subassembly disposed on a second planar substrate, wherein the receive antenna subassembly is comprised of two elongated antennas spaced apart from each other such that longitudinal axis of the two elongated antennas are parallel to each other but perpendicular to longitudinal axis of the transmit antenna and the first planar substrate is arranged substantially parallel with the second planar substrate; and
an amplifier circuit electrically coupled between the receive antenna subassembly and the transmit antenna.

2. The radio repeater of claim 1 wherein the transmit antenna and the two elongated antennas are in shape of a rectangle.

3. The radio repeater of claim 1 wherein the transmit antenna and the two elongated antenna are further defined as patch antennas.

4. The radio repeater of claim 1 wherein the transmit antenna and the two elongated antenna are further defined as slot antennas.

5. The radio repeater of claim 1 further comprises
a first feed pin electrically coupled to the receive antenna and positioned to maximize impedance matching, and
a second feed pin electrically coupled to the transmit antenna and positioned to maximize impedance matching.

6. The radio repeater of claim 1 wherein the transmit antenna and the receive antenna subassemblies are sized to operate in frequency range of 2.4 GHz to 2.5 GHz.

7. The radio repeater of claim 1 further comprises a rectangular metallic box interposed between the transmit antenna and the receive antenna subassembly, such that the first planar substrate and the second planar substrate are disposed on opposing surfaces of the rectangular metallic box and the amplifier circuit is contained in the rectangular metallic box.

8. The radio repeater of claim 1 further comprises
a first parasitic patch antenna disposed on a first ground plane, wherein the first ground plane is disposed on the receive antenna subassembly; and
a second parasitic patch antenna disposed on a second ground plane, wherein the second ground plane is disposed on the transmit antenna.

9. A radio repeater, comprising:
a transmit patch antenna having a rectangular shape and disposed on a first planar substrate;
a receive antenna assembly disposed on a second planar substrate, wherein the receive antenna assembly is comprised of two rectangular patch antennas spaced apart from each other whose inputs are connected by a microstrip line such that longitudinal axis of the two rectangular patch antennas are parallel to each other but perpendicular to longitudinal axis of the transmit patch antenna and the first planar substrate is arranged substantially parallel with the second planar substrate; and
an amplifier circuit electrically coupled between the receive antenna assembly and the transmit patch antenna.

10. The radio repeater of claim 9 wherein the spacing between the two rectangular patch antennas and the spacing of the two rectangular patch antennas to closest edge of the ground plane is configured so that each achieve a 180 degree phase difference in coupling signals of the transmit patch antenna.

11. The radio repeater of claim 9 wherein the two rectangular patch antennas having inputs connected by a microstrip and center of the microstrip is electrically coupled to the amplifier circuit.

12. The radio repeater of claim 9 further comprises
a first feed pin electrically coupled to the receive antenna and positioned to maximize impedance matching, and
a second feed pin electrically coupled to the transmit antenna and positioned to maximize impedance matching.

13. The radio repeater of claim 9 wherein the transmit antenna and the receive antenna subassemblies are sized to operate in frequency range of 2.4 GHz to 2.5 GHz.

14. The radio repeater of claim 9 further comprises a rectangular metallic box interposed between the transmit antenna and the receive antenna subassembly, such that the first planar substrate and the second planar substrate are disposed on opposing surfaces of the rectangular metallic box and the amplifier circuit is contained in the rectangular metallic box.

15. The radio repeater of claim 9 further comprises
a first parasitic patch antenna disposed on a first ground plane, wherein the first ground plane is disposed on the receive antenna subassembly; and
a second parasitic patch antenna disposed on a second ground plane, wherein the second ground plane is disposed on the transmit antenna.

* * * * *